United States Patent
Steinmann

[11] 3,919,613
[45] Nov. 11, 1975

[54] WIPER-WASHER CIRCUIT ARRANGEMENT

[75] Inventor: Helmut Steinmann, Baden-Baden, Germany

[73] Assignee: Robert Bosch G.m.b.H., Stuttgart, Germany

[22] Filed: Oct. 9, 1974

[21] Appl. No.: 513,516

[30] Foreign Application Priority Data
Oct. 11, 1973  Germany............................ 2350959

[52] U.S. Cl. ......... 318/443; 318/DIG. 2; 15/250.02
[51] Int. Cl.² ........................................... H02P 3/14
[58] Field of Search............... 318/443, 444, DIG. 2; 15/250.02, 250.13

[56] References Cited
UNITED STATES PATENTS

| | | | |
|---|---|---|---|
| 3,483,584 | 12/1969 | Patterson......................... | 15/250.02 |
| 3,594,846 | 7/1971 | Kimura............................ | 15/250.02 |
| 3,623,181 | 11/1971 | Bailly.............................. | 318/443 |
| 3,656,042 | 4/1972 | Keisuke........................... | 318/444 |
| 3,716,766 | 2/1973 | Suzuki............................ | 318/443 |
| 3,849,711 | 11/1974 | Elliott et al...................... | 318/443 |
| 3,869,654 | 3/1975 | Bischoff et al................... | 15/250.02 |

*Primary Examiner*—Robert K. Schaefer
*Assistant Examiner*—John J. Feldhaus
*Attorney, Agent, or Firm*—Michael S. Striker

[57] ABSTRACT

An electric wiper motor drives a wiper and has first and second wiper motor terminals. The wiper wipes the front of a vehicle headlight, a vehicle windshield or the like. A switch device includes a switch contact electrically connected to the first wiper motor terminal, a work contact and a rest contact, and a rotating device mechanically coupled to and driven by the wiper motor and operative for causing the switch contact to alternately come into electrical engagement with the work contact and with the rest contact. A source of electrical energy has first and second source terminals. The first and second wiper motor terminals are connected to the first and second source terminals, respectively, to establish a principal motor current path for the flow of wiper motor drive current. The principal motor current path can be closed and interrupted. An electric pump motor drives a pump which discharges a washing fluid onto the surface to be washed, and has first and second pump motor terminals. The first source terminal is electrically connected to the work contact for establishing an auxiliary current path for the flow of motor drive current when the switch contact is in electrical engagement with the work contact. The first pump motor terminal is electrically connected to the rest contact and the second pump motor terminal to the second source terminal, for establishing a braking current path for the flow of wiper motor braking current through the pump motor when the switch contact is in electrical engagement with the rest contact and the principal motor current path is in the interrupted condition.

7 Claims, 2 Drawing Figures

WIPER-WASHER CIRCUIT ARRANGEMENT

BACKGROUND OF THE INVENTION

The invention relates to a circuit arrangement for a wiper-washer arrangement, especially for wiping and washing the fronts of vehicular headlights, windshields, and the like. The type of wiper-washer arrangement in question is comprised of an electric pump motor, an electric wiper motor and an end-position switch device controlled by the wiper motor and comprised of a switch contact electrically connected to one terminal of the wiper motor and operative when it engages a work contact for establishing an auxiliary current path for the flow of wiper motor drive current when the principal current path is in interrupted condition, and operative when it engages a rest contact for closing a braking current path for the flow of wiper motor braking current.

Circuit arrangements of this type are already known; the pump motor is turned on intermittently by means of a separate switch controlled by the wiper motor. This switch is so designed that it turns on the pump motor at the beginning of the wiping cycle and keeps the pump motor on for a time equal to about one-fourth of the wiping cycle. This intermittent turning on of the pump motor is intended to minimize the amount of washing fluid, e.g., water, discharged onto the surface to be cleaned, e.g., the front of a vehicle headlight or a vehicle windshield, or the like.

The known circuit arrangement has a number of disadvantages. A separate switch is required for turning on and off the pump motor. The braking current path which is employed for the quick stopping of the wiper motor is closed by means of a contact provided on the manually activated switch used to start the wiper motor. Accordingly, an additional conductor is required between the just-mentioned contact on the manually activated switch and one terminal of the wiper motor. Furthermore, the manually activated switch must be provided with still another contact for opening and closing the braking current path.

SUMMARY OF THE INVENTION

It is a general object of the invention to avoid these disadvantages, i.e., to provide a circuit arrangement which is simpler and requires fewer switches, switch contacts and conductors than the prior-art arrangements while nevertheless functioning as effectively.

This object is achieved, according to the basic concept of the invention, by connecting the pump motor to the rest contact of the end-position switch device.

As a result of the invention expedient, a separate switch for controlling the pump motor becomes unnecessary, since the pump motor instead is connected to and disconnected from the power supply by means of one of the anyway-present contacts of the wiper-motor-driven end-position switch device. At the same time, the winding of the pump motor is utilized as the braking resistance for the wiper motor, so that it is no longer necessary to establish a braking current path for the wiper motor by moving a specially provided contact provided on the manually activated switch employed to start the wiper motor. As a result of this, the separate conductor otherwise required between the manually activated switch and the wiper motor, as well as the otherwise required additional set of contacts on the manually activated switch, become unnecessary.

According to one advantageous concept of the invention, in order to assure a sufficiently long energizing pulse for the pump motor, the wiper-motor-driven end-position switch device is comprised of a rotary switching disk which establishes electrical engagement between the various contacts of the switch device in synchronism with the rotation of the output shaft of the wiper motor, with the contacts which effect pump motor energization being maintained in electrical engagement with each other for a time interval corresponding to a switching-disk rotation angle greater than 90°, preferably 100°.

Accordingly, the pump motor is connected in parallel to the wiper motor until the wiper-motor-driven end-position switch device undergoes a transition from its rest condition to its work condition. At such point in time, which with a closing angle of 90° corresponds to the elapse of one-fourth the wiping cycle, the wiper motor continues to be connected to the voltage source, but now by means of an auxiliary current path, whereas the pump motor is disconnected from the voltage source. Accordingly, until such point in time, the manually activated switch employed to start the wiper-washer arrangement must be maintained closed, since otherwise the wiper motor would stop immediately upon release of the manually activated switch, because the auxiliary current path would not yet be closed. Accordingly, compared to the known wiper-washer arrangements, the activation time of the manually activated switch, for example a pushbutton switch, must be longer. However, this disadvantage is hardly of any practical importance, because, with a wiping cycle of 1-second duration, for example, and a pump-motor-energization angle of 90°, the activation time need never be greater than 300 milliseconds.

In another version of the invention, use is made of a pulse generator, preferably a monostable multivibrator, comprised of a transistor whose emitter-collector path is connected in a series with a relay winding and connectable to the voltage source by means of a manually activatable switch, with the relay winding controlling a relay switch operative for connecting the wiper motor to the voltage source. With such a circuit, the disadvantage of an activation time longer than required in similar prior-art devices is avoided, through the expedient of controlling the energization of the relay winding in dependence upon the operation of the wiper-motor-driven end-position switch device. With such a circuit arrangement, the relay winding remains energized until the switch contact comes into electrical engagement with the work contact, independently of whether before such point in time the connection between the voltage source and the pulse generator has been interrupted by opening of the manually activated switch which connects the two. The deenergization of the relay winding is accordingly synchronized with the change of electrical engagement of the switch contact of the end-position switch device.

When the circuit arrangement is such that the relay winding is connected in the collector-emitter path of a transistor, the just-mentioned synchronization can be achieved in a particularly simple manner, by applying to the base of such transistor a voltage derived from a junction in the principal current path for the wiper motor drive current located intermediate the voltage source and the relay switch.

The novel features which are considered as characteristic for the invention are set forth in particular in

DESCRIPTION OF THE PREFERRED EMBODIMENTS

Figure 1:
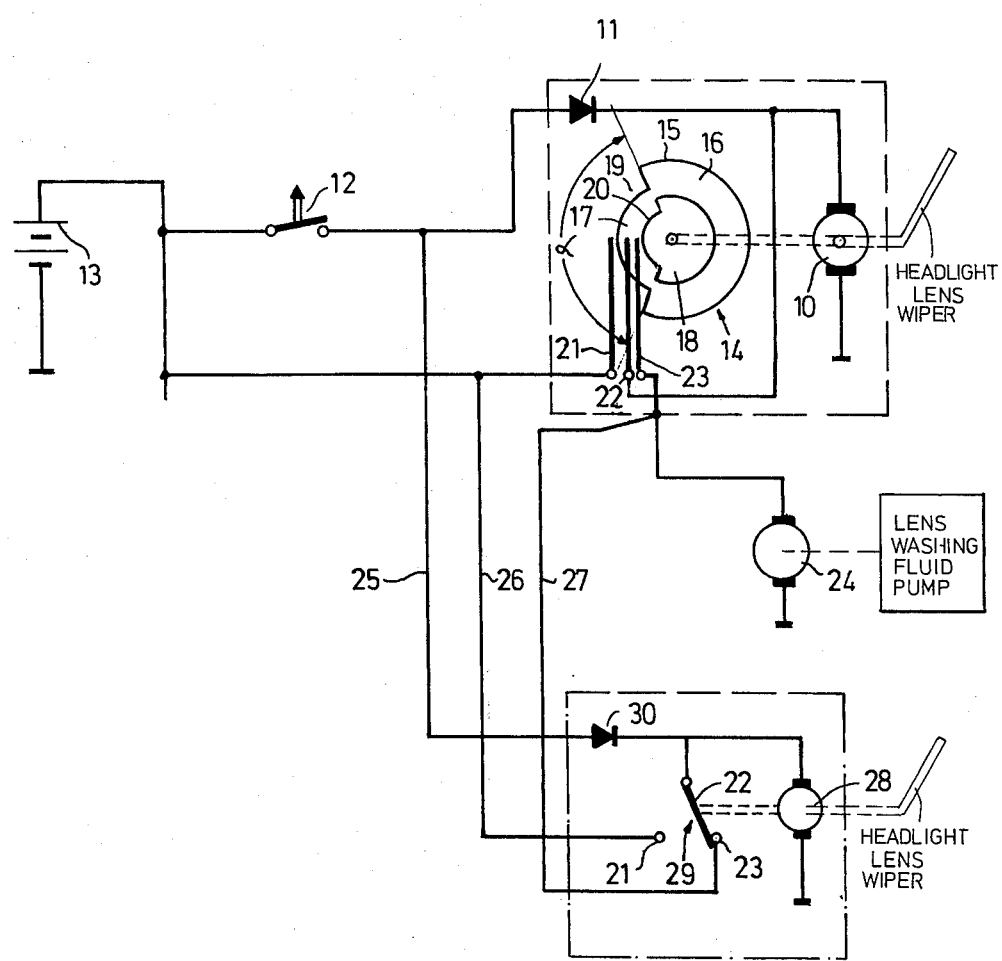
FIG. 1 depicts a first embodiment of the invention.

The embodiment depicted in FIG. 1 is comprised of a first wiper motor 10 and of a second wiper motor 28. The first wiper motor 10 has a first motor terminal connected, via a diode 11, and via a manually activatable switch 12, to the positive first terminal 13 of a voltage source, and a second motor terminal connected to ground. The output shaft of wiper motor 10 is mechanically coupled to an end-position switch device designated in toto with reference numeral 14. The end-position switch device 14 is comprised of a rotary switching disk 15. The rotary switching disk 15 is comprised of three contact tracks 16, 17, 18. The first contact track 16 has a non-conductive section 19. The third contact track 18 has a conductive section 20. The outer contact track 16 cooperates with a stationary work contact 21 connected to the positive first terminal 13 of the voltage source. The switch contact 22 of the end-position switch device 14 cooperates with the middle contact track 17 and is directly connected to the ungrounded first terminal of wiper motor 10. The end-position switch arrangement 14 further includes a stationary rest contact 23 which cooperates with the innermost contact track 18. Connected to the stationary rest contact 23 is the first motor terminal of an electric pump motor 24, the second motor terminal of which is connected to ground.

The second wiper motor 28 is connected in parallel to the first wiper motor 10 by means of the conductors 25, 26, 27. The second wiper motor 28 is provided with a respective end-position switch device 29, identical in construction to the end-position switch device 14 but depicted in only schematic manner. A diode 30 is connected in the conductor branch 25; the purpose of this diode will be explained further below.

The embodiment of FIG. 1 operates as follows:

When the rotary switching disk 15 of the end-position switch device 14 is in the illustrated position thereof, the wiper driven by the motor 10 is in its rest position. The mechanical coupling between the output shaft of motor 10 and the associated wiper is depicted only schematically, because it is per se conventional. The switch contact 22 in each of the two end-position switch devices 14, 29 is in electrical engagement with the respective rest contact 23; accordingly, the pump motor 24 and the two wiper motors 10, 28 are all connected in parallel. If now the manual switch 12 is closed, driving current will flow through the diode 11 to the wiper motor 10, and likewise through the diode 30 to the wiper motor 28. At the same time driving current flows to the pump motor 24, via the switch contact 22 and the rest contact 23 of the end-position switch device 14.

Accordingly, the output shafts of the wiper motors 10, 28 begin to turn while, at the same time, the pump motor 24 drives the washing fluid pump which discharges washing fluid onto the surface to be cleaned.

The end-position switch devices 14, 29 are respectively driven by the wiper motors 10, 28. Accordingly, as the output shafts of the wiper motors 10, 28 begin to turn, the associated rotary switching disks likewise turn. After each disk 15 turns through an angle alpha of about 100°, the electrically conductive engagement between contacts 22, 23 comes to an end, and electrically conductive engagement between contacts 21, 22 is established. As a result, there is established an auxiliary current path for the flow of motor current from the positive first terminal 13 of the voltage source to the non-grounded first motor terminal of motor 10; this auxiliary current path is comprised of the work contact 21 and the switch contact 22. Likewise, an auxiliary current path, comprised of the conductor 26 and the contacts 21, 22 of switch device 29, is established for the second wiper motor 29.

Accordingly, the wiper motors 10, 28 continue to be energizied, and their output shafts continue to turn, whereas the pump motor 24 is deenergized. The manually controlled switch 12 must be maintained closed until the establishment of these auxiliary motor current paths; otherwise, the wipers driven by the motors 10, 28 will not reach their end positions and will instead come to a standstill when the manually controlled switch 12 is prematurely opened.

The output shafts of the wiper motors 10, 28 continue to turn until the associated contacts 22 return into electrically conductive engagement with the associated rest contacts 23. If at this point in time the manually operated switch 12 is open, there will then be established a braking current path for each of the wiper motors, the two braking current paths being comprised of the respective contacts 22, 23 and the internal current path of the pump motor 24. The two wiper motors 10, 28 as a result come to a halt immediately, because the braking current paths which are thusly established virtually short-circuit the two wiper motors, the ohmic braking resistance presented to the wiper motors by the winding of the pump motor 24 being very low.

The diodes 11 and 30 prevent each of the two wiper motors 10, 28 from influencing the operation of the other wiper motor, when the wiper motor reaches the rest position. For instance, if the two surfaces which are wiped by the wiper members driven by the respective motors 10, 28 are dirtied to markedly different extents, it can happen that the wiper driven by motor 28, for example, reaches its end position before the wiper driven by motor 10. If the diode 11 were not connected in the motor current path, current might continue to be supplied to the wiper motor 28 via the auxiliary current path of the wiper motor 10, i.e., via the work contact 21, the switch contact 22 of the end-position switching device 14, the conductor 25 and the diode 30. The provision of the diodes 11, 30 is meaningful only when two wiper motors are connected in parallel.

With the embodiment depicted in FIG. 1, the pump motor 24 is accordingly energized for a limited time interval at the beginning of each wiping cycle. The energization time interval of the pump motor 24 in the embodiment of FIG. 1 is determined by the magnitude of the angle alpha depicted in FIG. 1.

The essential feature of the current arrangement depicted in FIG. 1 resides in the fact that the non-grounded second motor terminal of pump motor 24 is connected to the rest contact 23 of the end-position switch device 14 and via contact 23 is connectable to the positive first pole 13 of the voltage source. Accordingly, a separate switch for the pump motor 24 is not required. Since the winding of the pump motor 24 additionally presents a low-ohmic-value braking resistance, the internal current path of the pump motor 24 itself can be used to form the braking current path for the wiper motors 10, 28, making it possible to dispense with the otherwise conventional separate braking current conductor connected to a separate contact provided on the manually activated switch 12, this constituting a further simplification and resulting in a further cost reduction.

Figure 2:
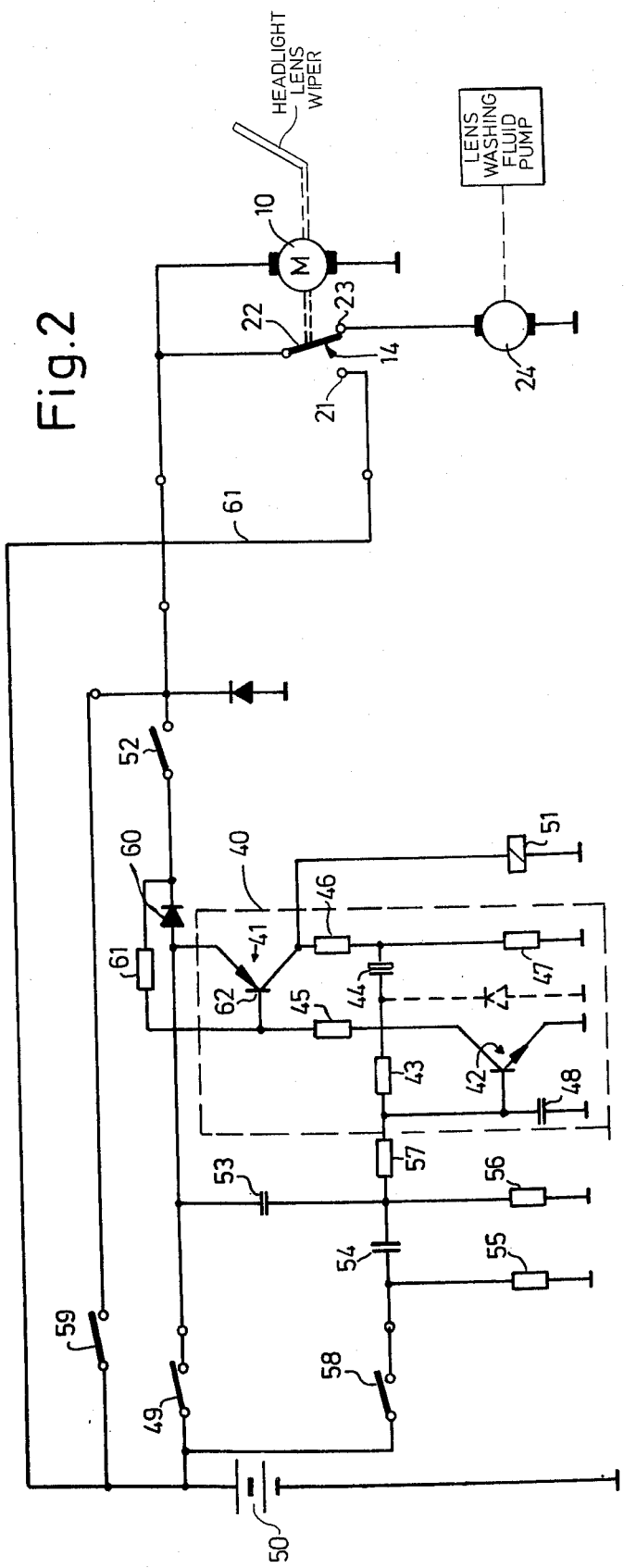
FIG. 2 depicts a second embodiment of the invention.

In the embodiment of FIG. 1, the manually activated switch 12 must be kept closed until the switching disk 15 has turned through the angle alpha. In the embodiment of FIG. 2, in contrast, the manually activated switch 12 need be closed only very briefly and can then be immediately reopened, i.e., released in the case of a pushbutton switch.

The circuit arrangement of FIG. 2 is comprised of a pulse generator, generally designed by reference numeral 40, and provided here in the form of a conventional monostable multivibrator. The monostable multivibrator 40 includes two multivibrator transistors 41, 42 which are both conductive during the unstable state and non-conductive during the stable state of the multivibrator. The multivibrator 40 further includes a feedback branch comprised of resistor 43 and capacitor 44, and additionally includes resistors 45, 46, 47. The capacitor 48 is provided for the purpose of shunting to ground short-lasting or high-frequency interference signals which might otherwise become applied to the base of transistor 42. The multivibrator 40 depicted is of per se known construction and its operation need not be described in detail. The duration of the unstable time interval of the monostable multivibrator 40 is determined essentially by the circuit values of the resistor 43 and capacitor 44.

As mentioned above, when the multivibrator 40 is in the unstable state, transistor 41 is conductive, so that current can flow from the voltage source 50, through the switch 49, through the emitter-collector path of transistor 41, and then through the relay winding 51, thereby energizing the latter. The relay winding 51 when energizes causes the relay switch 52 to close, the relay switch 52 in effect replacing the manually activatable switch 12 of FIG. 1.

The further capacitors 53, 54 and the further resistors 55, 56, 57 form differentiating stages, so that the triggering of the monostable multivibrator 40 will be dynamic, i.e., so that the monostable multivibrator 40 will be pulse-edge-responsive.

The wiper motor 10 and the pump motor 24 constitute parts of a wiping and washing arrangement for cleaning the fronts of vehicular headlights. The circuitry of the arrangement is accordingly so designed that the wiper motor 10 and the pump motor 24 are caused to operate when the parking light of the vehicle is turned on by means of the manually activated switch 49. Additionally, when the parking light remains on, the wiping and washing arrangement for the fronts of the vehicle headlights should be maintained in continuous operation in the event that the switch 58 is closed to activate the pump motor for the windshield washing arrangement. Furthermore, there can be provided a manually activatable switch 59 for separately turning on the wiping and washing arrangement for cleaning the headlight fronts.

It is essential, in this particular circuit arrangement that by way of the diode 60 there be derived from the current path between the voltage source 50 and the relay switch 52 a voltage which is then applied via the resistor 61 to the base 62 of the transistor 41, the emitter-collector path of the transistor 41 being connected in the current path of the relay winding 51.

The embodiment of FIG. 2 operates as follows:

When the switch 49 is closed, to turn on the vehicle parking light, the capacitor 53 charges and a positive voltage is applied to the base of transistor 42. As a result, transistor 42 becomes conductive, thereby establishing a current path for the base current of transistor 41. As a result, transistor 41 becomes conductive, and current flows through the relay winding 51. The relay switch 52 accordingly closes, and the wiper motor 10 becomes energized. By means of the switch contact 22 and the rest contact 23 of the end-position switch device 14, the pump motor 24 is likewise connected to voltage, so that washing fluid is discharged onto the surface to be washed. After the elapse of a certain time interval, i.e., when the switching disk 15 of the end-position switch device 14 has turned through the angle alpha, the pump motor 24 is disconnected from the driving voltage. However, at such time there is established an auxiliary current path for the wiper motor 10, so that the wiper motor 10 can continue to be energized; this auxiliary current path is comprised of the conductor 61, the work contact 21 and the switch contact 22 of the end position switch device 14.

The output shaft of the wiper motor 10 continues to turn until the relay winding 51 returns to the deenergized state. Thus at the start of each new wiping cycle the pump motor 24 is briefly energized. The number of possible wiping cycles is dependent upon the duration of the unstable time interval of the monostable multivibrator 40, which in turn is determined by the circuit values of the resistor 43 and capacitor 44. Specifically, as soon as the recharging of the capacitor 44 is completed, the transistors 41, 42 return to the non-conductive state and current flow through relay winding 51 ceases. In response, the relay switch 52 opens, so that the wiper motor 10 becomes deenergized as soon as the switch contact 22 of the end-position switch device 14 returns into electrical engagement with the rest contact 23. Then, as in the embodiment of FIG. 1, the pump motor 24 becomes connected in parallel with the wiper motor 10, with the winding of pump motor 24 constituting a braking current path for the wiper motor 10.

In the event that the parking light is maintained closed, i.e., in the event that switch 49 is maintained closed, the pulse generator 40 can alternatively be controlled by means of the switch 58 which is provided for turning on the (non-illustrated) windshield washing pump which discharges fluid onto the vehicle windshield. In the illustrated arrangement, in contrast to that of FIG. 1, it is essential that the switch 58 need not be held closed for the entire time required for the switching disk 15 of the end-position switch device 14 to turn through the predetermined closing angle alpha. Specifically, after the transistors 41, 42 have been rendered conductive by activation of the switch 58, thereby causing relay winding 51 to close relay switch 52, the transistor 41 remains conductive until the switch contact 22 is returned into electrical engagement with the work contact 21. This results from the connection of the base 62 of transistor 41 via resistor 61 to the biasing voltage which exists at the cathode of diode 60 so long as the relay switch 52 remains closed and current flows through diode 60 to wiper motor 10. Accordingly, the relay winding 51 cannot become de-energized until the switch contact 22 of the end-position switch device 14 comes into engagement with contact 23 and the pump is disconnected from the voltage source 50.

The circuit arrangement of FIG. 2 can be modified by employing the pulse generator 40 for the control of two wiper motors. Likewise, in the embodiment of FIG. 1, the second wiper motor can be eliminated, with the second wiper being mechanically coupled to the first wiper motor, so that both wipers are driven by a single wiper motor.

It will be understood that each of the elements described above, or two or more together, may also find a useful application in other types of circuits and constructions differing from the types described above.

While the invention has been illustrated and described as embodied in a wiping and washing arrangement for the fronts of vehicle headlights, windshields, and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a wiper-washer arrangement, particularly an arrangement for wiping and washing the front of a vehicle headlight, a vehicle windshield or the like, in combination, an electric wiper motor for driving a wiper, having first and second wiper motor terminals; a switch device comprising a switch contact electrically connected to said first wiper motor terminal, a work contact and a rest contact, and further including switching means mechanically coupled to and driven by said wiper motor and operative for causing said switch contact to alternately come into electrical engagement with said work contact and said rest contact; a source of electrical energy having first and second source terminals; means for connecting said first and second wiper motor terminals to said first and second source terminals, respectively, to establish a principal motor current path for the flow of wiper motor drive current, and including means for interrupting said principal motor current path; an electric pump motor for driving a pump which discharges a washing fluid onto the surface to be washed, having first and second pump motor terminals; means connecting said first source terminal to said work contact for establishing an auxiliary current path for the flow of wiper motor drive current when said switch contact is in electrical engagement with said work contact; and means connecting said first pump motor terminal to said rest contact and said second pump motor terminal to said second source terminal, for establishing a braking current path for the flow of wiper motor braking current through said pump motor when said switch contact is in electrical engagement with said rest contact and said principal motor current path is in interrupted condition.

2. The arrangement defined in claim 1, wherein said switching means comprises a rotating switching disk driven by said wiper motor and in engagement with said contacts and operative for establishing electrical engagement between said switch contact and said work contact as said disk turns through an angle greater than 90° and operative for establishing electrical engagement between said switch contact and said rest contact during the remainder of one rotation of the switching disk.

3. The arrangement defined in claim 2, wherein said angle is 100°.

4. The arrangement defined in claim 1, wherein said means for interrupting said principal motor current path includes a pulse-generating circuit stage comprised of an output transistor having an emitter-collector path, a relay winding connected in series with said emitter-collector path, and a relay switch which closes when said relay winding becomes energized connected in said principal motor current path and a manually activatable switch connected in said principal motor current path, and further including means for controlling the energization of said relay winding in dependence upon the operation of said switch device.

5. The arrangement defined in claim 4, wherein said means for controlling the energization of said relay winding comprises means for applying to the base of said transistor a voltage derived from a circuit junction connected in said principal motor current path intermediate said first source terminal and said relay switch.

6. The arrangement defined in claim 5, wherein said means for controlling the energization of said relay winding further includes a diode connected in said principal motor current path intermediate said first source terminal and said relay switch and means for applying across the base-emitter junction of said transistor the voltage drop across said diode.

7. In a wiper-washer arrangement, particularly an arrangement for wiping and washing the front of a vehicle headlight, a vehicle windshield, or the like, in combination, a first and a second electric wiper motor for driving a first and a second wiper, respectively, each of said motors having respective first and second motor terminals; first and second switch devices, each comprising a switch contact electrically connected to the first motor terminal of a respective one of said motors, a work contact and a rest contact, and each switch device further including switching means mechanically coupled to and driven by a respective one of said motors and operative for causing the associated switch contact to alternately come into electrical engagement with the associated work contact and the associated rest contact; a source of electrical energy having first and second source terminals; means for connecting said first and second motor terminals of each of said motors to said first and second source terminals, respectively, to establish first and second principal motor current paths for the flow of wiper motor drive current through said first and second motors, respectively, and including means for interrupting said principal motor current paths; an electric pump motor for driving a pump which discharges a washing fluid onto the surfaces to be washed by the wipers driven by said wiper motors, said electric pump motor having first and second pump motor terminals; means connecting said first source terminal to the work contact of each of said switch devices for establishing first and second auxiliary current paths for the flow of drive current through said first and second wiper motors, respectively, when the respective switch contacts are in electrical engagement with the respective work contacts; and means electrically connecting said first pump motor terminal to both said rest contacts and connecting said second pump motor terminal to said second source terminal, for establishing a braking current path for the flow of wiper motor braking current through said pump motor when said switch contacts are in electrical engagement with said rest contacts and said principal motor current paths are in interrupted condition, and further including first and second diodes respectively connected in said first and second principal motor current paths for preventing energization of each of said wiper motors by current flowing through the auxiliary current path associated with the other one of said wiper motors.

* * * * *